May 25, 1965   K. W. STALKER ETAL   3,185,325
SHUTTLE CAR
Filed April 12, 1962   3 Sheets-Sheet 2

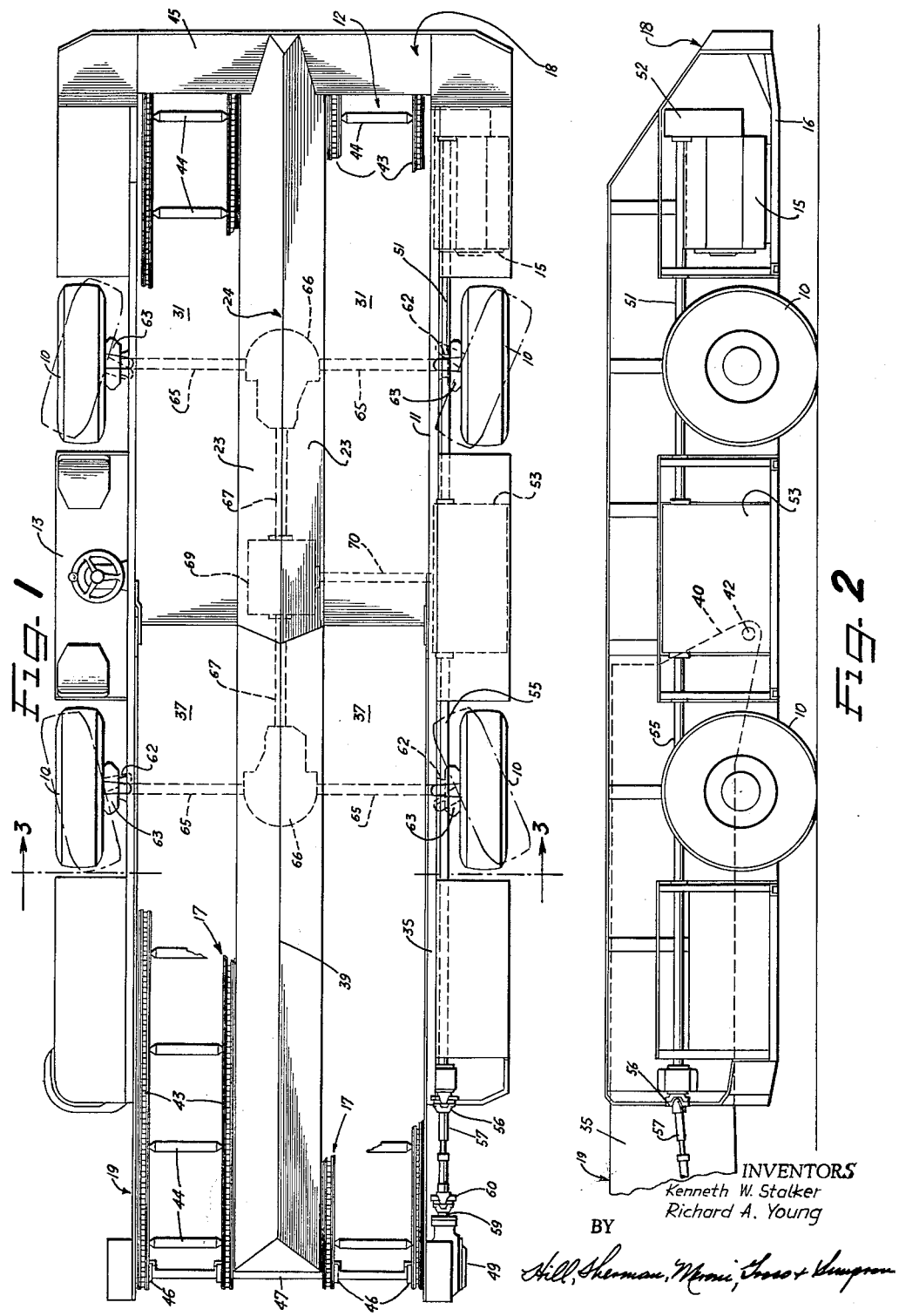

INVENTORS
Kenneth W. Stalker
Richard A. Young
BY

May 25, 1965 K. W. STALKER ETAL 3,185,325
SHUTTLE CAR
Filed April 12, 1962 3 Sheets-Sheet 3
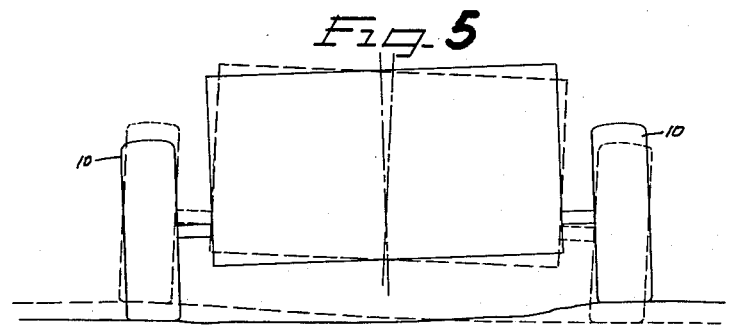
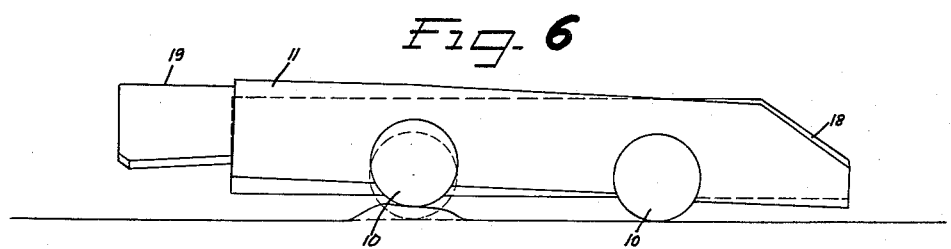
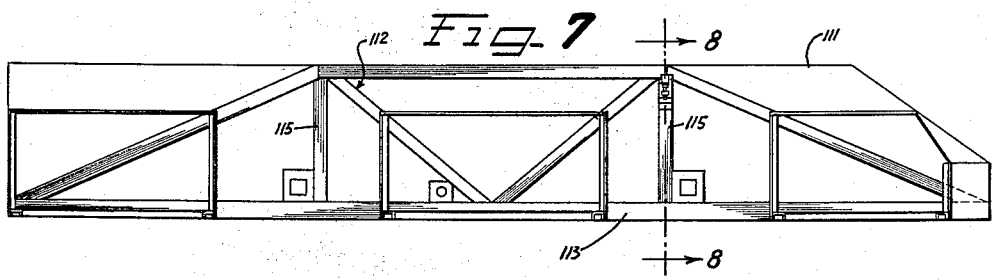
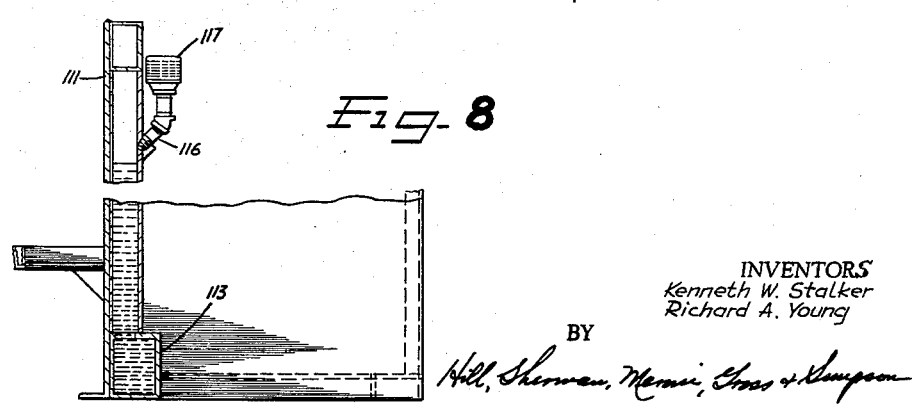
INVENTORS
Kenneth W. Stalker
Richard A. Young
BY

# United States Patent Office 3,185,325
Patented May 25, 1965

3,185,325
SHUTTLE CAR
Kenneth W. Stalker, Western Springs, and Richard A. Young, Chicago, Ill., assignors to Goodman Manufacturing Company, Chicago, Ill., a corporation of Illinois
Filed Apr. 12, 1962, Ser. No. 187,065
3 Claims. (Cl. 214—83.36)

This invention relates to improvements in haulage vehicles, such as shuttle cars used for hauling loose material in underground mining.

Conventional shuttle cars used for hauling coal, rock and the like in underground mining have heretofore been relatively heavy and rigid, the weight of the empty car itself being more than half the fully loaded weight of the car. Such shuttle cars have also been mounted on at least one transversely pivoted axle to assure all four wheels of the car have traction on the ground when traveling over rough ground.

Such shuttle cars are restricted in their load carrying capacity and the wheel mountings, due to space limitations, can only accommodate the wheels to drop into holes of substantially six inches in depth and still maintain all four wheels on the ground. The wheels however, lose their tractive effort when the depths of the holes are greater than six inches.

A principal object of the present invention is to remedy the foregoing deficiencies in shuttle cars, and to increase the load carrying capacity and tractive effort of the car by making the frame and material carrying compartment of the car sufficiently flexible that the wheels may be positively mounted on the side walls of the car and have firm engagement with the ground, when traveling over rough ground.

A further object of the invention is to increase the material carrying capacity of shuttle cars and improve upon the tractive effort of the cars by mounting the four drive and steering wheels of the shuttle car directly on the side walls of the material carrying compartment of the car, and by providing sufficient flexibility in the material carrying compartment of the car to provide improved tractive effort on the four drive and steering wheels when traveling along rough ground.

A further object of the invention is to increase the material carrying capacity of a shuttle car and improve upon the tractive effort of the car on the ground, by constructing the frame of the car from light weight flexible material of high tensile strength, and by providing sufficient flexibility in the structure of the car to provide improved tractive effort of all four wheels on the ground.

A further object of the invention is to provide an improved form of shuttle car so constructed that the wheels may be directly mounted on the side walls of the car forming the material carrying compartment of the car, and by providing a central hump extending centrally along the car in the space between the side walls of the car, receiving the differentials for driving all four wheels of the car.

A still further object of the invention is to improve upon the shuttle cars heretofore used for hauling loose material in underground mining by constructing the body of the car from a light weight flexible material and by arranging the spacers for the side walls of the car to afford a maximum amount of flexibility of the car.

A still further object of the invention is to improve upon the material carrying capacity of shuttle cars by increasing the flexibility of the car sufficiently to enable the wheels of the car to be directly mounted on the side walls thereof, and by driving the wheels of the car from differentials recessed within upwardly extending humps extending along the longitudinal central portion of the car.

A still further object of the invention is to increase the compactness of shuttle cars and the like by making the bracing means for the side walls of the car hollow and by utilizing the hollow bracing means as a fluid storage tank.

These and other objects of the invention will appear from time to time as the following specification proceeds and with reference to the accompanying drawings wherein:

FIGURE 1 is a plan view of a shuttle car constructed in accordance with the principles of the present invention;

FIGURE 2 is a side elevational view of the shuttle car shown in FIGURE 1, with the discharge portion of the car broken away;

FIGURE 5 is a diagrammatic front end view of the shuttle car, diagrammatically showing flexure of the frame, while traveling over irregular ground;

FIGURE 6 is a diagrammatic side view of the shuttle car illustrating the flexure of the frame when the car is traveling over irregular ground;

FIGURE 7 is a fragmentary view in side elevation of the side frame of a shuttle car illustrating a modified form in which the shuttle car frame may be constructed; and FIGURE 8 is a partial fragmentary sectional view taken substantially along line 8—8 of FIGURE 7 and showing a part of the fluid pressure reservoir in transverse section.

Figure 3:
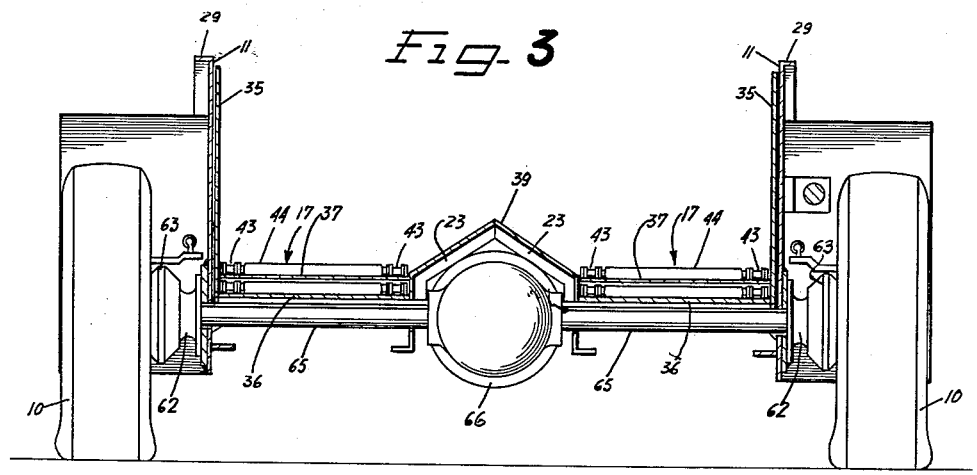
FIGURE 3 is a transverse sectional view taken substantially along line 3—3 of FIGURE 1.

In the embodiment of the invention illustrated in the drawings, FIGURES 1 and 2 show a haulage vehicle, commonly called a shuttle car, and used for haulage in underground mining, for transporting loose material from a loading machine or continuous mining machine to a central loading station, to be transported from the mine by conveyors, mine cars and the like.

The shuttle car is supported on rubber tire mounted front and rear steering and drive wheels 10, mounted directly on the outsides of side plates 11, 11 and includes a material carrying compartment 12 extending for the length of the car between the side plates 11, 11.

As shown in FIGURE 1, the car includes an operator's compartment 13 extending outwardly of one side plate 11 between the front and rear wheels 10 and includes a motor 15 extending outwardly of the opposite side plate 11 of the car, and mounted on a platform 16. The motor 15 serves as a drive means for the four wheels 10, and for a pair of spaced endless chain and flight conveyors 17 extending from a receiving hopper portion 18 of the car between the side plates 11, to and along a vertically adjustable discharge portion 19 of the car. The side plates 11, 11 extend for the length of the frame of the car and are straight throughout their length with no flare and the area of said side plates along and above the wheels is unoccupied by structure to expose the wheels in plan view and thereby avoid the impairment of the flexibility of said side plates.

The side plates 11, 11 and frame for the car may be made from a light weight material of relatively thin cross section, a preferred material being aluminum, although magnesium, titanium or a thin section stainless steel may be used in certain designs of cars.

The side plates 11, 11 extending for the length of the frame for the car are connected together at their extreme front and rear end portions by spacer beams 20, 20. Rearwardly of the spacer beam 20 at the receiving end of the material carrying compartment of the car are two spacer beams 21, 21 extending across the material carrying compartment and having central inverted generally V-shaped structures 22, 22 extending upwardly from the center thereof and forming supports for inclined central plates 23, 23, forming a longitudinal separator or inclined hump 24, separating the two endless chain and flight conveyors 17.

Just rearwardly of the spacer beams 21 are a series of parallel spacer beams 25, spacing the side plates apart and having upwardly extending downwardly opening central inverted V-shaped structures 26 formed therein, accommodating the drive mechanism for driving the front and rear wheels 10 to be recessed above the floor of the material carrying portions of the conveyors 17.

Rearwardly of the rear wheels 10 are a pair of parallel spaced transversely extending spacer beams 28, spacing the side plates 11 apart and disposed beneath the vertically adjustable discharge end portion 19 of the material carrying compartment of the shuttle car.

The spacer beams 20, 20, 21, 21, 25, 25 and 28, 28 may be welded or otherwise secured to the side plates 11 close to the bottom thereof and accommodate flexing and twisting of the frame and of said side plates with respect to each other, as the car is traveling over rough ground.

Figure 4:
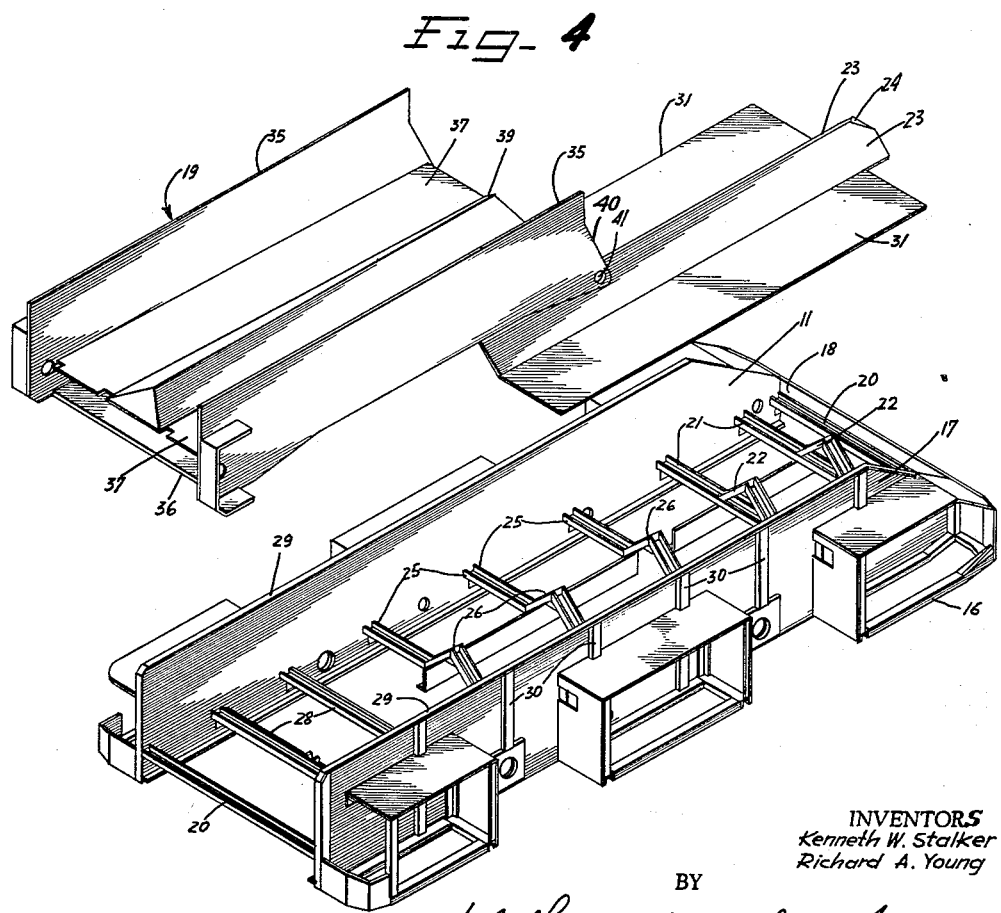
FIGURE 4 is an exploded perspective view of a shuttle car frame.

The side plates 11, 11 are shown in FIGURES 2, 3 and 4 as having outwardly bent flanges 29 extending along the upper end portions thereof and downwardly along opposite ends thereof, to strengthen said side plates. The side plates 11, 11 are further strengthened by parallel spaced vertically extending bars 30, 30, suitably secured to the outsides of said side plates and extending vertically downwardly from the flanges 29.

The beams 20, 20, 21, 21 and 25, 25 form supports for plates 31, 31 forming material carrying plates for the material carrying runs of the endless chain and flight conveyors 17. Similar plates (not shown) are spaced downwardly of the plates and extend parallel thereto for supporting the return runs of the conveyors.

The rear discharge section of the conveyors 17 includes parallel spaced side walls 35 connected together at their lower ends by a bottom plate 36, forming a support for the return runs of the conveyors and by vertically spaced material carrying plates 37, along which material carrying runs of the endless chain and flight conveyors 17 travel. The plates 37 terminate at their inner sides into an inverted V-shaped hump 39 like the hump 24 and extending for the length of the discharge section of the conveyor.

The plates 35, 35 have forwardly and downwardly extending forward end portions 40, 40 having apertured portions 41, 41 pivoted to the inside of the side plates 11 as by pivot pins 42, 42, in a conventional manner. The discharge end portion of the conveyor may be held in a selected discharge position, and may be raised and lowered by operation of suitable hydraulic jacks (not shown) controlled by the usual valves (not shown) at the operator's compartment 13, in a conventional manner.

The conveyors 17 include the usual parallel spaced endless chain 43, 43 connected together by parallel spaced flights 44, 44, and turning about suitable idler sprockets or rollers (not shown) disposed beneath an apron 45 extending across the front or receiving end hopper portion 18 of the shuttle car and trained about and driven from drive sprockets 46, 46 on a transverse shaft 47, extending across the discharge end portion 19 of the shuttle car. The shaft 37 is driven from right angled drive gearing (not shown), contained within a housing 49 mounted on the outside of a side plate 35, shown in FIGURES 1 and 2 as being the right hand side plate, when looking from the discharge to the receiving end of the car.

The shaft 47 and conveyors 17 are driven from the motor 15 through a drive shaft 51 extending from a gear housing 52, housing reduction gearing (not shown) for driving the shaft 51 from the motor 15. The drive shaft 51 in turn extends within a housing 53 mounted between the wheels 10, 10 on the opposite side plate 11 from the operator's compartment 13. A drive shaft 55 leads from the housing 53 and is driven from the shaft 51 through suitable gearing (not shown) contained within the housing 53 and driving a universal coupling 56. The universal coupling 56 in turn drives an extensible drive shaft 57, driving a shaft 59 through a universal coupling 60. The shaft 59 is journalled in and extends forwardly of the housing 49 and forms the drive means for the right angled drive gearing contained within the housing 49. The two conveyors 17 may thus be driven from the motor 15 through the universal couplings 56 and 60 and the extensible drive shaft 57, in all positions of elevation of the discharge section 19 of the shuttle car with respect to the ground.

The front and rear wheels 10, 10 are mounted directly on the outside of the side walls 11 on mounting brackets 62 mounted on the outsides of the side walls 11 and projecting outwardly therefrom. The drive to the wheels 10, 10 includes universal joints, (not shown) contained within housings 63 supporting the wheels 10, 10 and supported on said mounting brackets for movement about steering axes. The universal joints may be a form of constant velocity universal joint known to the trade as a Rezeppa joint, and no part of the present invention so not herein shown or described further.

The drives to the four wheels 10 and universal joints (not shown) contained within the housings 63 comprise drive shafts 65 driven from differential drive gearing (not shown) contained within differential housings 66 recessed within the longitudinally extending downwardly opening recess formed by the hump 24. The differential drive gearing (not shown) contained within the housings 66 is driven from drive shafts 67 driven from a power divider (not shown) contained within the housing 69 and dividing the power of a transverse shaft 70, between the front and rear drive wheels. The housing 69 for the power divider is also recessed within the recess form by the hump 24 and the transverse shaft 70 is driven from the motor 15 and shaft 51 through suitable gearing contained within the housing 53.

It may be seen from the foregoing that by recessing the differential housings 66, 66 and the housing 69 for the power divider within the hump 39 that it is possible to maintain the material carrying portions of the conveyor 17, 17 closely adjacent the ground, and to mount the wheels 10, 10 directly on the side walls of the shuttle car. This construction avoids the necessity of mounting the drive wheels to extend along the outsides of the side plates 11 and thus makes it possible to move the side plates 11 outwardly the distance previously required for the drive shafts, the gear housings housing the gearing for driving the drive shafts, which from necessity have heretofore been mounted on the outsides of the side plates.

FIGURES 5 and 6 are diagrammatic views illustrating the flexing of the car body and the angular relation of the four wheels mounted rigidly on the side plates of the shuttle car when the car is traveling rough ground having high rises and deep holes therein. The frame and load carrying compartment of the shuttle car being of a simple rectangular cross section, and the frame and side plates being made from aluminum or other material of high tensile strength, which is approximately three times as flexible as steel, provides sufficient flexibility that the flexing of the frame, including the side plates 11, enables the wheels to have firm contact with the ground under various extreme road conditions.

For example, conventional shuttle cars have stiff steel bodies and mounting the wheels for relative movement with respect to the bodies are generally designed to maintain traction on all four wheels when one wheel drops into a hole no deeper than six inches. By the present construction, the wheels may be directly mounted on the side walls of the flexible aluminum body, which has been designed to be flexible enough to accommodate one wheel to drop into a ten inch hole and still keep all four wheels firmly on the ground.

In FIGURES 7 and 8 we have diagrammatically shown a modified form of frame structure embodying the principles of the invention having side walls 111. Each side wall 111 has a truss 112 extending along the outside thereof. The truss 112 is in the form of a hollow beam 113 extending along the lower edge of the side wall 111 and having communication with spaced vertically extending hollow uprights 115. The beam 113 and hollow uprights 115 are shown in FIGURE 8 as having communication with each other. A pipe 116 leads from an upright 115 and has a breather cap 117 at its upper end. The beam 113 may thus be filled with hydraulic fluid, while the upright 115 provides sufficient head to maintain hydraulic fluid in the beam 113 throughout the length thereof, when the car is traveling on the level or up or down inclined roadways.

If necessary a hollow beam (not shown) may extend across the side plates 111 and have communication with hollow beams on each side of the shuttle car, to provide the storage capacity for hydraulic fluid to operate the fluid pressure jacks for raising and lowering the discharge section of the shuttle car as well as hydraulic steering mechanism and motors for driving the conveyors of the shuttle car, where it is desired to drive the conveyors hydraulically.

The arrangement just described increases the compactness of the car by making it unnecessary to provide a storage reservoir for hydraulic fluid on one side or the other of the car and also improves the balance of the car.

While we have herein shown and described one form in which our invention may be embodied, it may readily be understood that various variations and modifications in the invention may be attained without departing from the spirit and scope of the novel concepts thereof, as defined by the claims appended hereto.

We claim as our invention:

1. In a shuttle car,
   a flexible frame having parallel spaced straight upright side walls,
   longitudinally spaced spacer beams extending across said side walls adjacent the lower end portions thereof connecting said side walls together in spaced relation with respect to each other to form a load carrying compartment,
   certain of said spacer beams having a downwardly opening central upwardly extending V-shaped portion formed as a part thereof,
   divider plates extending along said V-shaped portions and forming a hump,
   a pair of individual conveyors extending along said load carrying compartment on opposite sides of said hump,
   four drive and steering wheels,
   mounting brackets for all four of said wheels mounted directly on the outsides of said side walls and mounting said wheels on said side walls for driving and steering,
   the area along said side walls in the region of said wheels and above said wheels being unoccupied to expose said wheels in plan view,
   a motor mounted on the outside of one side wall and projecting laterally therefrom,
   a drive shaft extending along the outside of one of said walls and driven by said motor for driving said conveyors,
   a transverse drive shaft extending inwardly of said side wall and driven by said motor,
   a power divider recessed within the recess formed by said downwardly opening V-shaped portions of said spacer beams and driven by said transverse drive shaft,
   individual differentials recessed within the recess formed by said downwardly opening V-shaped portion of said spacer beams,
   and driven by said power divider for driving said wheels,
   said side walls being straight throughout their length and height and made from a thin flexible metal and the flexibility of said frame being due to the inherent nature of the metal from which said frame is made,
   the straightness of said side walls and the spacer beams connecting said side walls together at their lower ends and with said side walls forming a torisonally unstable column providing sufficient torsional instability of said frame about said neutral axis to maintain all four wheels on the ground when one or more of said wheels drops into a hole at least 8" deep.

2. A shuttle car in accordance with claim 1 in which the frame is made from thin section aluminum.

3. A shuttle car in accordance with claim 1 in which the frame is made from thin section stainless steel.

References Cited by the Examiner

UNITED STATES PATENTS

| | | | |
|---|---|---|---|
| 1,802,876 | 4/31 | Cooper | 292—28.3 |
| 2,108,215 | 2/38 | Stief et al. | 296—28.4 X |
| 2,192,650 | 3/40 | Russell | 214—83.36 |
| 2,588,341 | 3/52 | Beck | 214—83.36 |
| 2,754,015 | 7/56 | Lee | 214—83.36 |
| 2,788,908 | 4/57 | Lynd | 214—505 |
| 2,846,263 | 8/58 | La Rue | 296—28.2 |
| 2,962,176 | 11/60 | Russell | 214—83.36 |
| 3,064,837 | 11/62 | Manney | 214—83.36 |

HUGO O. SCHULZ, *Primary Examiner.*

GERALD M. FORLENZA, *Examiner.*